(12) United States Patent
Wu et al.

(10) Patent No.: US 11,764,047 B2
(45) Date of Patent: Sep. 19, 2023

(54) GENERAL-PURPOSE NANOCHIP FOR MASS SPECTRUM ANALYSIS, PREPARATION METHOD THEREFOR, AND APPLICATION THEREOF

(71) Applicant: Hangzhou Well-Healthcare Technologies Co., LTD, Hangzhou (CN)

(72) Inventors: Jianmin Wu, Hangzhou (CN);
Xiaoming Chen, Hangzhou (CN);
Xisheng Chen, Hangzhou (CN);
Qiaoling Zhong, Hangzhou (CN);
Chunyan Luan, Hangzhou (CN);
Jiekai Yu, Hangzhou (CN)

(73) Assignee: Hangzhou Well-Healthcare Technologies Co., LTD, Hangzhou (CN)

( * ) Notice: Subject to any disclaimer, the term of this patent is extended or adjusted under 35 U.S.C. 154(b) by 299 days.

(21) Appl. No.: 17/303,218

(22) Filed: May 24, 2021

(65) Prior Publication Data

US 2021/0280406 A1  Sep. 9, 2021

Related U.S. Application Data

(63) Continuation of application No. PCT/CN2019/099604, filed on Aug. 7, 2019.

(30) Foreign Application Priority Data

Nov. 23, 2018 (CN) .......................... 201811403743.8

(51) Int. Cl.
*H01J 49/04* (2006.01)
*H01J 49/00* (2006.01)
*B82Y 15/00* (2011.01)

(52) U.S. Cl.
CPC ...... *H01J 49/0418* (2013.01); *H01J 49/0009* (2013.01); *B82Y 15/00* (2013.01)

(58) Field of Classification Search
CPC .... H01J 49/0418; H01J 49/0009; B82Y 15/00
See application file for complete search history.

(56) References Cited

U.S. PATENT DOCUMENTS

2010/0248388 A1    9/2010   Girault et al.

FOREIGN PATENT DOCUMENTS

| CN | 202230053 U | 5/2012 |
| CN | 106814130 A | 6/2017 |

(Continued)

OTHER PUBLICATIONS

"International Application No. PCT/CN2019/099604, International Search Report and Written Opinion dated Oct. 30, 2019", (dated Oct. 30, 2019), 11 pgs.

*Primary Examiner* — Nicole M Ippolito
*Assistant Examiner* — Hanway Chang
(74) *Attorney, Agent, or Firm* — Schwegman Lundberg & Woessner, P.A.

(57) ABSTRACT

A universal nanochip for mass spectrometry analysis and preparing method and application of the same, relates to a technical field of mass spectrometry analysis. A main material of the nanochip is a silicon-based semiconductor material, array-type spotting wells are distributed at a surface of the main material, and an inner surface of the spotting well is of a nanostructure; the surface of the main material has a regional hydrophobic modification, and inside the array-type spotting well is a hydrophilic region and outside the spotting well is a hydrophobic region; or outside the array-type spotting well is a hydrophilic region and inside the spotting well is a hydrophobic region. The nanostructure can extract molecules on a surface of a biological tissue sample to be (Continued)

tested, and improves laser energy absorption and utilization, thereby improving ionization efficiency and enhancing mass spectrum signals. The universal nanochip can be widely applied to clinical inspection.

10 Claims, 8 Drawing Sheets

(56) References Cited

FOREIGN PATENT DOCUMENTS

| | | |
|---|---|---|
| CN | 106884156 A | 6/2017 |
| CN | 107192757 A | 9/2017 |
| CN | 107490615 A | 12/2017 |
| CN | 107515243 A | 12/2017 |
| CN | 107907585 A | 4/2018 |
| CN | 207689423 U | 8/2018 |
| CN | 109541012 A | 3/2019 |
| WO | WO-2020103497 A1 | 5/2020 |

Fig. 1

|  | Steel Target Plate || Nanochip ||
|---|---|---|---|---|
| Strain Name | Identification Result | Score (three-point rubric) | Identification Result | Score (three-point rubric) |
| Enterococcus Faecalis | Enterococcus Faecalis | 2.17 | Enterococcus Faecalis | 1.45 |
| Escherichia Coli | Escherichia Coli | 1.61 | Escherichia Coli | 1.61 |
| Pseudomonas Aeruginosa | Streptococcus Equinus | 1.12 | Pseudomonas Aeruginosa | 1.41 |
| Pseudomonas Aeruginosa | Enterococcus Cecorum | 1.21 | Escherichia Coli | 1.32 |
| Acinetobacter Baumannii | Acinetobacter Baumannii | 1.55 | Acinetobacter Baumannii | 2 |
| Escherichia Coli | Escherichia Coli | 1.54 | Escherichia Coli | 2.03 |
| Burkholderia Cepacia | Bacteroides Ovatus | 1.21 | Burkholderia Cepacia | 2.07 |
| Burkholderia Cepacia | Burkholderia Cepacia | 1.06 | Burkholderia Cepacia | 1.86 |
| Klebsiella Pneumoniae | Enterobacter Cloacae | 1.55 | Klebsiella Pneumoniae | 1.94 |
| Accuracy | 55.56% || 88.89% ||

| identification scores of escherichia coli for 55 wells in a same target of the nanochip | | | | | | | | | | |
|---|---|---|---|---|---|---|---|---|---|---|
| 2.16 | 2.20 | 2.21 | 2.24 | 2.21 | 2.19 | 2.13 | 2.22 | 2.21 | 2.22 | 2.16 |
| 2.17 | 2.24 | 2.24 | 2.21 | 2.23 | 2.10 | 2.17 | 2.23 | 2.25 | 2.17 | 2.23 |
| 2.21 | 2.18 | 2.24 | 2.24 | 2.25 | 2.19 | 2.21 | 2.24 | 2.26 | 2.25 | 2.23 |
| 2.23 | 2.16 | 2.25 | 2.25 | 2.30 | 2.21 | 2.24 | 2.16 | 2.20 | 2.22 | 2.24 |
| 2.19 | 2.22 | 2.25 | 2.24 | 2.18 | 2.20 | 2.17 | 2.23 | 2.24 | 2.24 | 2.13 |

GENERAL-PURPOSE NANOCHIP FOR MASS SPECTRUM ANALYSIS, PREPARATION METHOD THEREFOR, AND APPLICATION THEREOF

CROSS-REFERENCE TO RELATED APPLICATIONS

This application is a continuation of International Application No. PCT/CN2019/099604 filed Aug. 7, 2019, which claims the benefit of priority to Chinese Application No. 201811403743.8, filed Nov. 23, 2018, the benefit of priority of each of which is claimed herein and which applications are hereby incorporated by reference herein in their entirety.

TECHNICAL FIELD

The disclosure relates to a technical field of mass spectrometry analysis, in particular to a universal nanochip for mass spectrometry analysis and a preparing method and application of the same.

BACKGROUND ART

A principle of matrix-assisted laser desorption ionization-time-of-flight mass spectrometry (MALDI-TOF-MS) is to mix a matrix compound capable of absorbing laser energy with a sample to be measured to form a cocrystallization, and the matrix absorbs and transmits the energy to the sample to be measured for an ionization of the sample to be measured; and ions are accelerated throughout a flight pipeline in an electric field, with different mass-to-charge ratios (m/z) being detected according to different flight time to the detector. MALDI-TOF, as a soft ionization technique, is an important detection tool in drug screening and clinical diagnosis, which can be applied to protein, peptide, microorganism and SNP gene detections.

A sample target plate is one of the most important consumables of an MALDI-TOF mass spectrometer; and a commercial common target plate is made of stainless steel, although it can be reused, there are some problems that: (1) it needs an ultrasonic cleaning with organic reagents such as acetone, acetonitrile and ethanol after use, and this process is cumbersome; (2) it is easy to cause sample residues and scratches on a surface of the target plate, resulting in cross contamination, affecting a flatness of the target plate and crystallization of the matrix, and further affecting an accuracy of clinical sample identification; (3) when a detection is made to small molecule samples, it is easily interfered by matrix peaks, and when a detection is made nucleic acid samples, the matrix crystallization is non-uniform and a signal-to-noise ratio is low, and a mass spectrometry imaging of tissue samples cannot be directly carried out, with a narrow application range; (4) its preparing cost is high, and it is difficult to popularize in a field of high-throughput clinical mass spectrometry. At present, most of disposable target plates are made of non-conductive plastics and fibers, which is unfavorable to sample ionization and mass spectrometry peak. In Patent CN107907585, a fibrous filter paper is used as a main material of the target plate, and a surface of the filter paper is coated with wax layer to realize a hydrophobic property; in Patent CN202230053, conductive plastic is used as a main body of the target plate of which a surface is covered with a hydrophobic film; although costs of these two disposable target plates is low, the surface of the target plate has no microstructure, and a sample well on the surface of the target plate only acts as a sample carrier, which makes little contribution to peaks of the mass spectrum signal, and the mass spectrum signal is not significantly improved compared with a stainless steel target plate. In Patent CN107515243, a titanium dioxide nanocrystalline layer is sintered on a surface of a stainless steel target plate, which can improve an intensity of mass spectrum signal above 20K Da, while a molecular weight region for microbial identification, peptide and nucleic acid test is below 20K Da; in Patent CN106884156, a titanium dioxide nano-film is deposited on a surface of a stainless steel target plate, which is only used in a field of purifying phosphopeptides. The disposable target plate with a metal as conductive material for doping or surface modification of nano-materials presents a complex manufacturing process, further increased cost, which leads to a single sample for detection and the limited application field.

SUMMARY

An object of the disclosure is to provide a universal nanochip for mass spectrometry analysis, a preparing method and application of the same, which can improve energy absorption and utilization, improve ionization efficiency, enhance mass spectrometry signals and can be widely applied to a field of clinical inspection.

To achieve the above object, the present disclosure provides the following technical scheme:

A universal nanochip for mass spectrometry analysis is provided0 main material of the nanochip is a silicon-based semiconductor material, array-type spotting wells are distributed at a surface of the main material, and an inner surface of the spotting well is of a nanostructure; the surface of the main material has a regional hydrophobic modification with a hydrophobic region being a surface of the main material inside or outside the array-type spotting well.

Further, a thickness of the nanostructure is 0.2 to 5 μm.

Further, the nano structure is selected from any one or more of nanowires, nanofibers, nanocolumns, nanopyramids, nanoparticles, and nanoporous.

Further, the silicon-based semiconductor material is selected from any one or more of single-crystal silicons, polycrystalline silicons, silicon-based epitaxial metals, silicon-based epitaxial nonmetallic elemental substances, and silicon-based epitaxial oxides.

Further, a surface modification of the hydrophobic region is made by chemical vapor deposition or liquid phase chemical modification, and an adopted reagent is selected from any one or more of silanes, siloxanes, thiols and terminal olefins.

Further, the array-type spotting wells are round or square in shape.

A preparing method of a universal nanochip for mass spectrometry analysis is provided, including following steps:

S1, scribing a main material, wherein the main material is scribed using a laser or a grinding wheel in a clean room;

S2: cleaning the main material, wherein the scribed main material is placed in a concentrated sulfuric acid/hydrogen peroxide mixed solution for an ultrasonic cleaning, washing the solution on a surface of the main material with deionized water; and placing sequentially the main material into an ethanol solution and an isopropanol solution for an ultrasonic cleaning;

S3: patterning the array-type spotting well, wherein any one or more of metal stamping, lithography, a blue film method and screen printing are adopted to realize a patterning design on the surface of the main material;

S4: constructing a nanostructure on an inner surface of the array-type spotting well, wherein the nanostructure is prepared at a position corresponding to the array-type spotting well by using any one or more of reactive ion etching, chemical vapor deposition, physical vapor deposition, atomic layer deposition, wet chemical etching, a template method, a hydrothermal method and drop coating according to the pattern on the surface of the main material; and S5: hydrophobically modifying the surface of the main material.

An application of a universal nanochip for mass spectrometry analysis is provided, which includes the following aspects: rapid clinical identification of microorganisms, fungi and other samples; rapid detection of small molecule metabolites in biological samples such as sweat, saliva, fingerprints, cells and tissues; drug sensitivity testing of antibiotics; rapid mass spectrometry imaging of tissue samples; SNP gene detection; detection of protein and peptide in serum.

Compared with the prior art, the disclosure has following beneficial effects:

1. The inner surface of the array-type spotting well in the present disclosure is of a nanostructure, which has a tip enhancement effect, and a needle tip morphology on the surface is easy to generate a high-energy electric field to promote an ionization of analytes; and therefore, the nanostructure in the spotting well improves a signal-to-noise ratio of mass spectrometry peaks and enhances the mass spectrometry signal.

2. The traditional metal target plate of the mass spectrometry needs to rely on the matrix to transfer the energy to the sample to be tested, so that the matrix and the sample to be tested can be cocrystallized, which cannot avoid interference of the matrix to the testing of low molecular weight substances. The nanostructure in the spotting well of the nanochip of the disclosure has significant electromagnetic field enhancement effect and charge transfer capability so that no additional organic matrix is required, and matrix-free detection of small molecular weight substances (<1000 Da) such as antibiotics (small drug molecules), liposomes, amino acids, vitamins and the like can be realized.

3. The traditional commercial metal target plate is generally reused, which is easy to cause influence of residual samples, and it needs to be cleaned continuously for clinical testing, which is time-consuming and labor-consuming, with a reduced test throughput, which cannot meet clinical requirements; however, raw materials and tools used in the disclosure are common and the preparing method is simple, so labor and material costs are low, which realizes disposability of the chip, omits a tedious cleaning step for the target plate, avoids cross-contamination in the sample testing, and improves the simplicity and throughput of the mass spectrometry test.

4. The disclosure has wide clinical applications, and can be used for the rapid clinical identification of the microorganisms, fungi and other samples, the rapid detection of small molecule metabolites, drug sensitivity testing of low molecular weight antibiotics, the rapid mass spectrometry imaging of tissue samples, the SNP gene detection and so on.

BRIEF DESCRIPTION OF THE DRAWINGS

In the figures: 1—Array-type spotting well; 2—Main Material.

DETAILED DESCRIPTION

In the following, the technical scheme in the embodiment of the disclosure will be described clearly and completely; obviously, the described embodiment is intended to be only a part of the embodiment of the disclosure, but not all of them. On a basis of the embodiments in this disclosure, all other embodiments obtained by the ordinary skilled in the art without any creative effort are within the protection scope of this disclosure.

The disclosure provides a universal nanochip for mass spectrometry analysis. A main material of the nanochip is a silicon-based semiconductor material, including single-crystal silicons, polycrystalline silicons, silicon-based epitaxial metals, silicon-based epitaxial nonmetallic elemental substances, and silicon-based epitaxial oxides. Further, epitaxial metals on a silicon substrate include iron, copper, aluminum and/or gold, etc; and epitaxial nonmetallic elemental substances include graphene and/or materials with carbon nanostructures; and epitaxial oxides include $SiO_2$, $Al_2O_3$, $TiO_2$, and/or ZnO, etc. Array-type spotting wells are distributed at a surface of the main body material, the spotting well is round or square in shape, samples to be tested are placed in the array-type spotting well, and matrix need to be added in some testing applications.

An inner surface of the spotting well can be of a nanostructure, which includes nanowires, nanofibers, nanocolumns, nanopyramids, nanoparticles and/or nanoporous. A thickness of the nanostructure is 0.2 to 5 μm. A needle tip morphology of a nanostructure surface has functions of electric field enhancing and electron transferring, and after laser energy is absorbed, charges separates so as to produce a high-energy electric field, which promotes an ionization of an analyte and greatly enhances intensity and sensitivity of a signal. The tip of a nanostructure can be regarded as a microextraction head, which can sample molecules on a surface of the analyte when it comes into contact with the analyte. Therefore, from tested microbial data, the signal intensity is superior to that for the traditional stainless steel target. From the antibiotic and metabolic small molecule data, it can be seen that extracted chemical substances can be detected more effectively with a direct ionization and desorption under a laser without assisting of the matrix. The nanostructure also has a large specific surface area, and the sample and matrix solutions are more volatile on the surface of the nanostructure, which accelerates a drying process and improves the test throughput.

Figure 1:
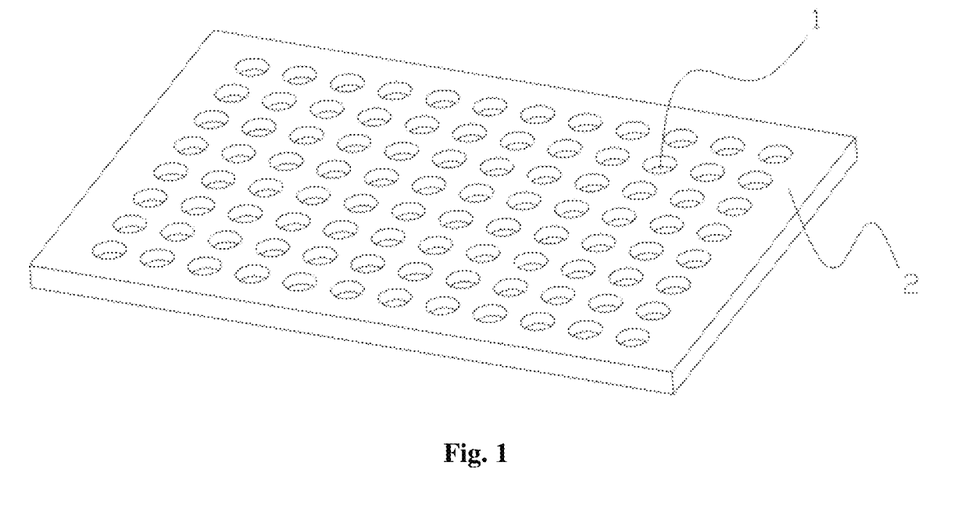
FIG. 1 is a schematic structural diagram of a nanochip according to an embodiment of the present disclosure.

In order to realize a limited region, the surface of the main material has a regional hydrophobic modification, as shown in FIG. 1, with a hydrophobic region being a surface of the main material 2 inside or outside the array spotting well 1. The surface modification of the hydrophobic region is made by chemical vapor deposition or liquid phase chemical modification, and an adopted reagent is selected from any one or more of silanes, siloxanes, thiols and terminal olefins.

Embodiment 1

In this embodiment, the main material of the nanochip is silicon-based epitaxial metal, specifically aluminum. 8×12 array-type spotting wells are distributed on the surface of the main body material, the spotting well is round in shape. A thickness of the nanowire structure is 0.2 μm, and the hydrophobic area is a surface of the main material 2 outside the array-type spotting well. The modification of the hydrophobic region is made by chemical vapor deposition.

Embodiment 2

In this embodiment, the main material of the nanochip is silicon-based substrate with nonmetallic elemental substance, specifically graphene. 8×12 array-type spotting wells are distributed on the surface of the main body material, the spotting well is round in shape. A thickness of the nanowire structure is 1.5 μm, and the hydrophobic region is the inner surface of the array spotting well 1, and the modification of the hydrophobic region is made by a liquid-phase chemical modification method.

Embodiment 3

The embodiment also provides a preparing method of a universal nanochip for mass spectrometry analysis, which includes following steps S1 to S5.

In S1, the main material is scribed, in which the main material is scribed using a laser or a grinding wheel in a clean room. A scribing size varies according to a size of a mass spectrometer target holder and the number of sample holes (96 wells or 384 wells), with a general size of 54 mm*36 mm.

In S2, the main material is cleaned, in which the scribed main material is placed in a concentrated sulfuric acid/hydrogen peroxide mixed solution for an ultrasonic cleaning, with a ratio of the concentrated sulfuric acid to the hydrogen peroxide in the solution being between 1:1 and 10:1; then the solution on a surface of the main material is flushed with deionized water, and sequentially the main material is placed in an ethanol solution and isopropanol solution for an ultrasonic cleaning; organic matters and dust are removed from the surface of the main material; and finally, the surface of the main material is dried with nitrogen.

In S3, the array-type spotting well is patterned, in which metal stamping, lithography, a blue film method and/or screen printing are adopted to realize a patterning design on the surface of the main material. A diameter size of the spotting well ranges from 20 microns to 3 millimeters as required. For example, in the blue film method, a blue film with a sample well pattern of appropriate size and shape is customized as required, and the blue film is closely attached to the surface of the main material when heated to 60° C. Then 0.01 to 0.2 g $AgNO_3$ solid is weighed and dissolved in 10 to 50 ml HF solution with a concentration of 3 to 5M, and the patterned single-crystal silicon wafer is placed in the solution to react for 10 to 60 min. After etching, the silicon wafer is transferred to a nitric acid solution to remove silver, and a reaction time is 30 to 60 min. After that, the silicon wafer is rinsed with deionized water and blown dry with nitrogen to obtain the array-type spotting well.

In S4, a nanostructure is constructed on the inner surface of the array-type spotting well, in which the nanostructure is prepared at a position corresponding to the array-type spotting well by using reactive ion etching, chemical vapor deposition, physical vapor deposition, atomic layer deposition, wet chemical etching, a template method, a hydrothermal method and/or drop coating according to the pattern on the surface of the main material. For example, for the chemical vapor deposition, a silane gas is introduced into a tubular furnace at 800 to 950° C. to react for 5 min to 1 h, so that the nanowire structure grows in the spotting well of the main material.

In S5, the surface of the main material is hydrophobically modified, the modification of the hydrophobic region is made by a liquid-phase chemical modification method, with toluene or acetone as a solvent, a concentration of undecylenic acid being 1 to 20%, and heating and refluxing being for 5 to 30 min.

Embodiment 4: Application of Nanochip in Clinical Microorganism Identification

Figure 2:
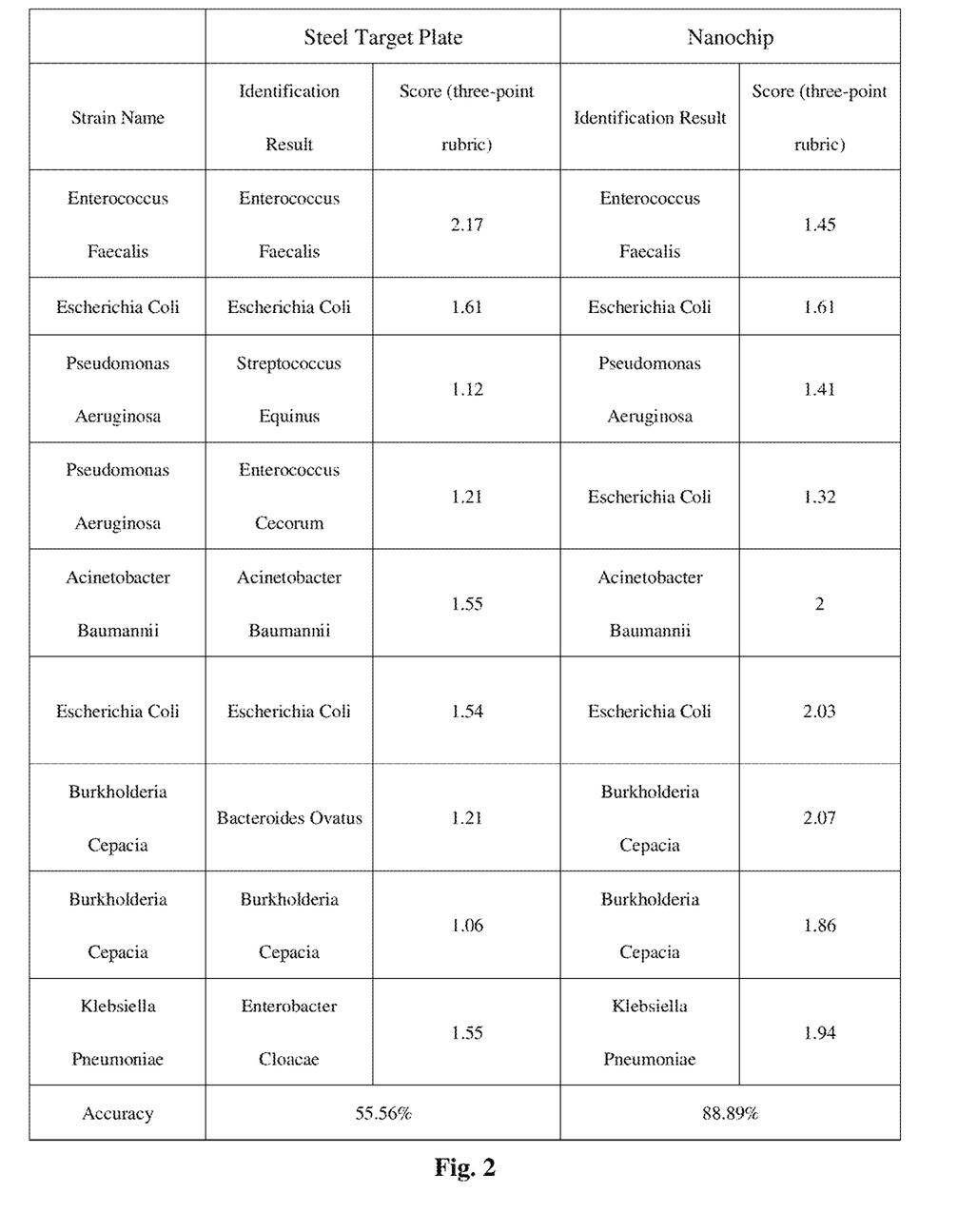
FIG. 2 is a graph showing testing results of the nanochip of the present disclosure in clinical microorganism identification.

In a bacteria coating method, a small number of colonies were picked out from the plate with a 10 μL gun head, and lightly coated on the nanochip and the stainless steel target, and 2 μL of a 50% formic acid solution was added; after being dried, 1 μL of CHCA matrix was dripped, which was then dried in a dryer at room temperature. The testing completed on a MALDI-TOF mass spectrometer with a linear positive ion mode, with a molecular weight in the test being 2 to 10 KDa and using a delayed extraction. Testing results were shown in FIG. 2. According to an identification of 9 common clinical pathogenic bacteria on a commercial stainless steel target plate and the nanochip, it could be seen that an accuracy of identification results on the nanochip was high and the score was higher than that on the stainless steel target, which reflects advantages of the nanochip in microbial identification.

Figure 3:
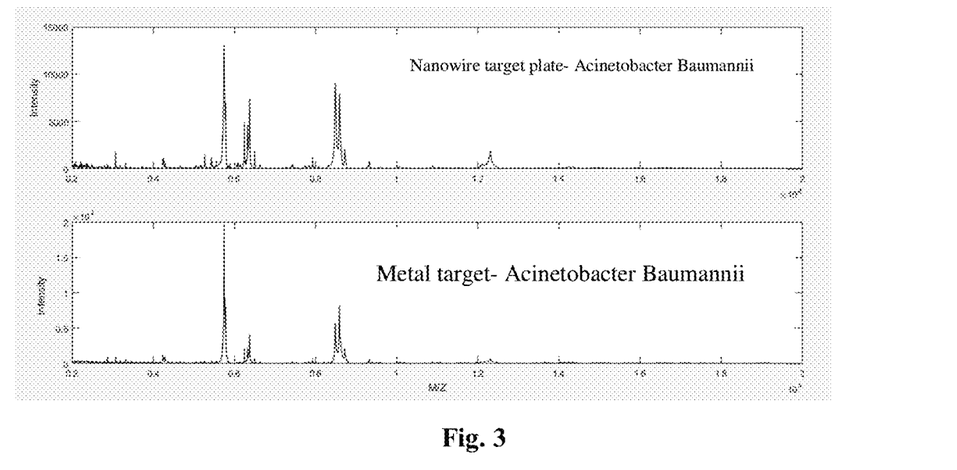
FIG. 3 shows a comparison of mass spectra of *Acinetobacter baumannii* for a nanowire target plate of the present disclosure and for a traditional metal target plate.
Figure 4:
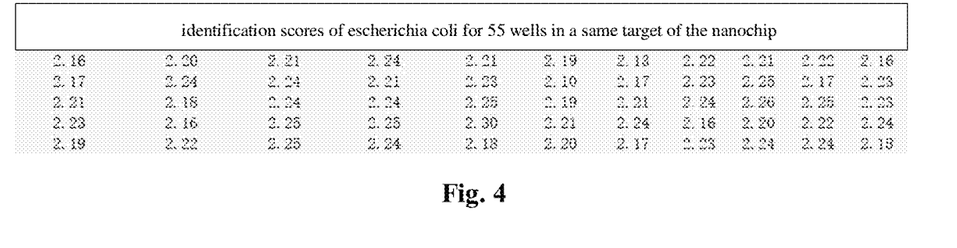
FIG. 4 is an identification score diagram of *Escherichia coli* for 55 wells in a same target of the nanochip.
Figure 5:
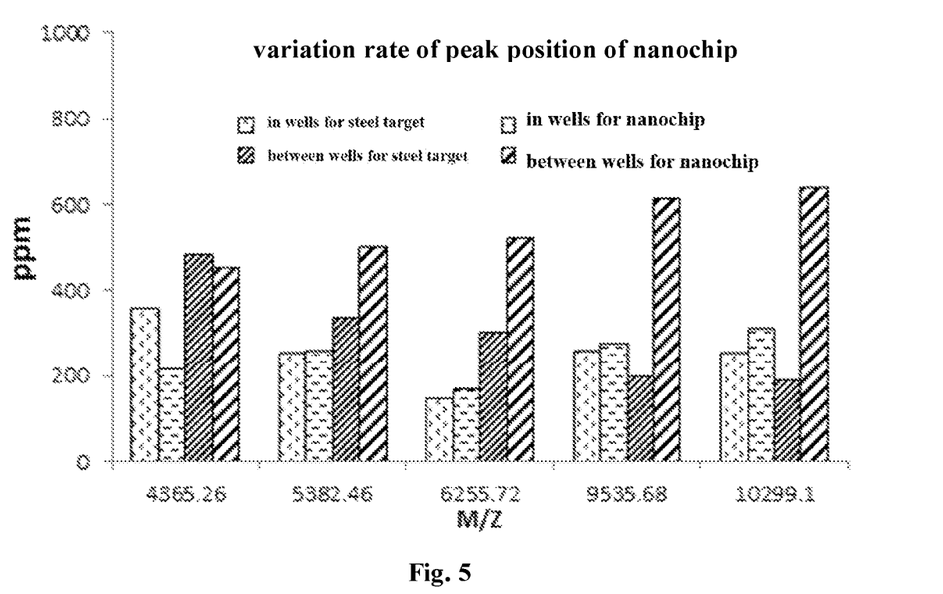
FIG. 5 is a schematic diagram of a variation rate of a mass spectrum peak position of the nanochip.

It can be seen from FIG. 3 that for the mass spectra of *Acinetobacter baumannii*, the number of peaks for the nanochip is obviously more than that for the stainless steel target, and this higher peak efficiency makes the microbial identification score and accuracy of the nanochip higher than that of the stainless steel target. Identification repeatability between the wells on the nanochip is measured with *Escherichia coli*, and as shown in FIG. 4, the identification scores of 55 wells on the nanochip are all above 2.0, and the repeatability between the wells is very good. As shown in FIG. 5, a variation rate of the molecular weight in and between the wells of the nanochip was further evaluated with five standard peak positions of the *Escherichia coli*, compared with the metal target, the variation rate of peak positions in the nanochip wells was lower than 300 ppm. The variation rate of peak positions between the wells of the nanochip is below 600 ppm. Although the variation rate of the four peaks with molecular weight greater than 5000 is slightly higher, the variation rates of the molecular weights in and between the wells of the nanochip are all below 600 ppm, which meets the requirements of the microbial identification.

Embodiment 5: Application of Nanochip in SNP Detection

Figure 6:
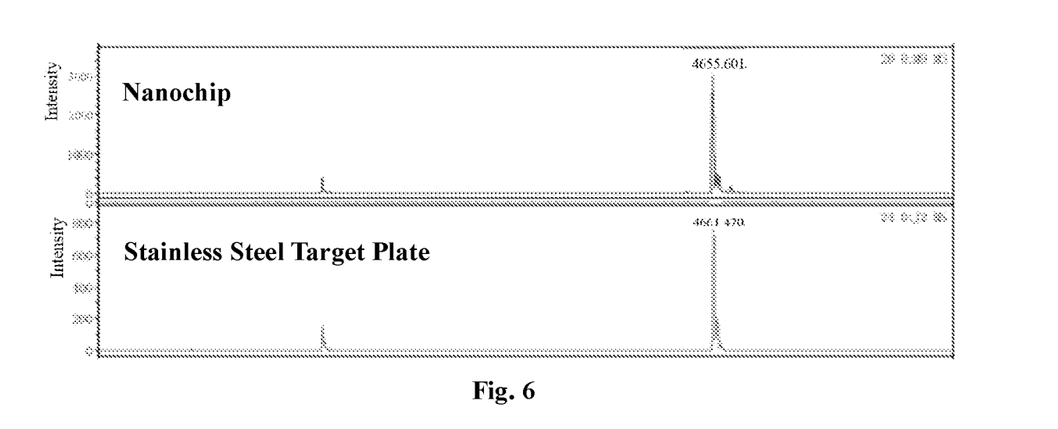
FIG. 6 shows a comparison of mass spectra of nucleic acids with a same concentration on a nano chip and on a stainless steel target plate.

A DNA fragment containing SNP sites were amplified by PCR and then purified to remove free dNTP in this system. Then a single base extension reaction was carried out, and then a resin purification was further carried out to remove impurities such as salt. After completion, the amplified DNA sample could be dripped into the wells of the target plate, and tested with a linear positive ion or negative ion mode, with a molecular weight in the test being 2 to 10 KDa and using a delayed extraction. As shown in FIG. 6, an intensity of a mass spectrum peak of nucleic acid to be tested (sequence: TA CAG GTG AAG GTG; molecular weight: 4657.09 Da) detected with the nanochip in the negative ion mode is much higher than that of a commercial metal target, which proves that a detection sensitivity of the mass spectrum for the nanochip target is obviously improved.

Embodiment 6: Application of Nanochip in Antibiotic Sensitivity Experiment

Figure 7A:
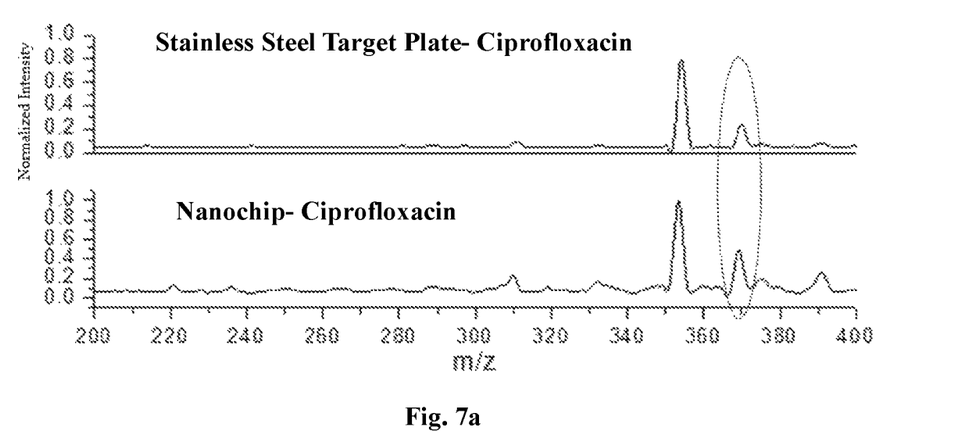
FIG. 7a shows a comparison of mass spectra of ciprofloxacin tested on a stainless steel target plate and on a nanochip.
Figure 7B:
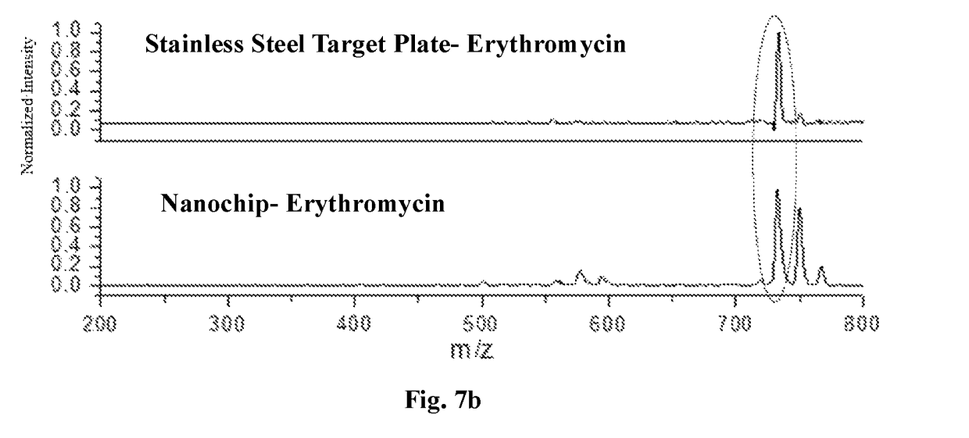
FIG. 7b shows a comparison of mass spectra of erythromycin tested on a stainless steel target plate and on a nanochip.

Firstly, antibiotics such as ciprofloxacin and erythromycin were respectively mixed with LB liquid culture medium at a concentration of 0.05 mg/ml. For the stainless steel metal target, the mixed solution of the antibiotics and the LB was first spotted on the stainless steel metal target, and after drying the CHCA matrix was dripped; and for the nanochip, the mixed solution of the antibiotics and the LB was dripped directly on the nanochip, without matrix. After drying, the mass spectrometry was carried out with the linear positive ion mode, with a molecular weight in the test <1000 Da and using a delayed extraction. As shown in FIG. 7a and FIG. 7b, relative signals of the ciprofloxacin and the erythromycin on the nanochip are stronger than those for the metal target, which reduces interference of the culture medium, and can obtain high-quality antibiotic spectra without the matrix.

Embodiment 7: Application of Nanochip in Small Molecule Detection

Figure 8A:
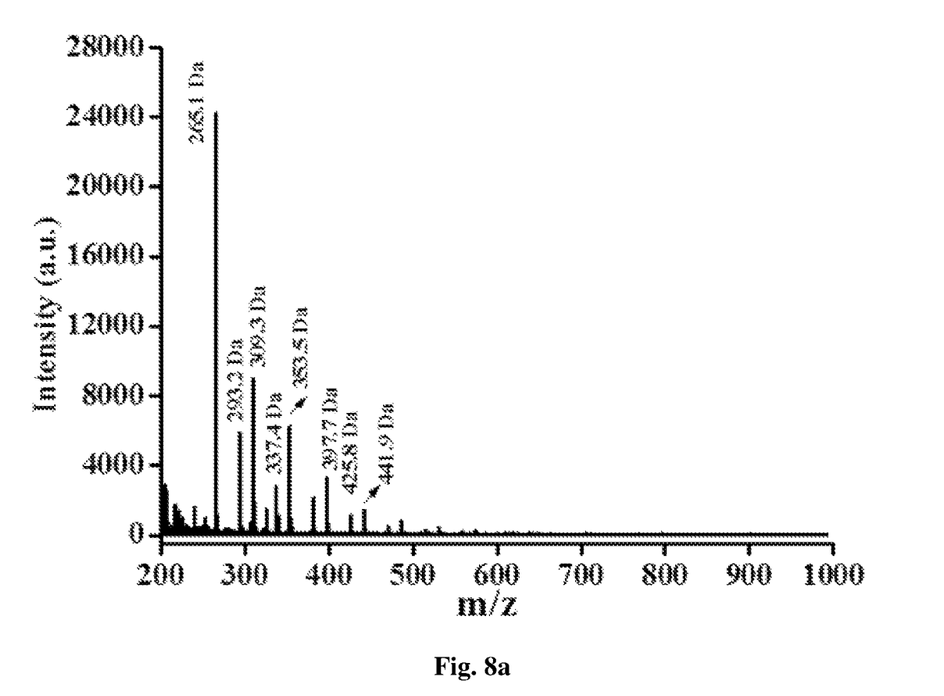
FIG. 8a shows mass spectra of small molecule metabolites in finger sweat tested on a nanochip.

Metabolic information in sweat and tissue samples can be obtained by microextraction from a tip of nanowires on the nanochip. The fingerprint sweat was obtained by clenching a fist for 5 min after a fingertip was cleaned and dried with deionized water, and then the fingertip was pressed on the nanochip lightly for 15 s, and then the mass spectrometry was directly performed with a reflecting negative ion mode, with a molecular weight in the test <1000 Da and using a delayed extraction. As shown in FIG. 8a, small molecule information of metabolites in the sweat can be obtained without matrix.

Figure 8B:
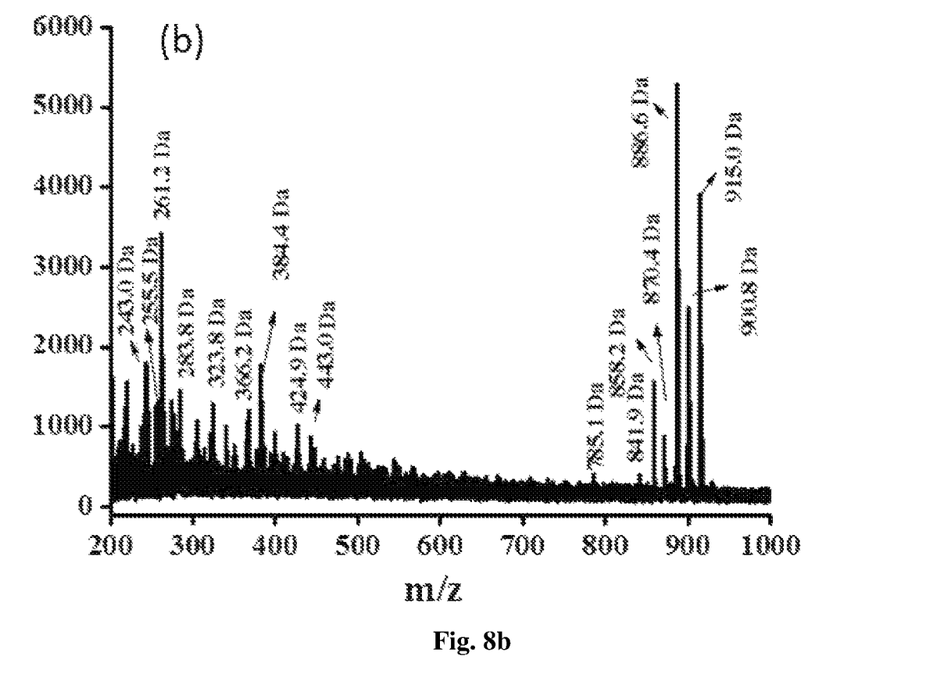
FIG. 8b shows mass spectra of liposomes in mouse kidney tissue tested on a nanochip.

The nanochip was pressed on a surface of mouse kidney tissue solid or slice for 30 s, and then washed with deionized water to remove excess tissue solid. After drying, the mass spectrometer was directly performed with a reflecting negative ion mode, with a molecular weight in the test <1000 Da and using a delayed extraction. As shown in FIG. 8b, liposome information of a surface of mouse kidney tissue can be obtained without matrix.

Embodiment 8: Application of Nanochip in Mass Spectrometry Imaging

Figure 9A:
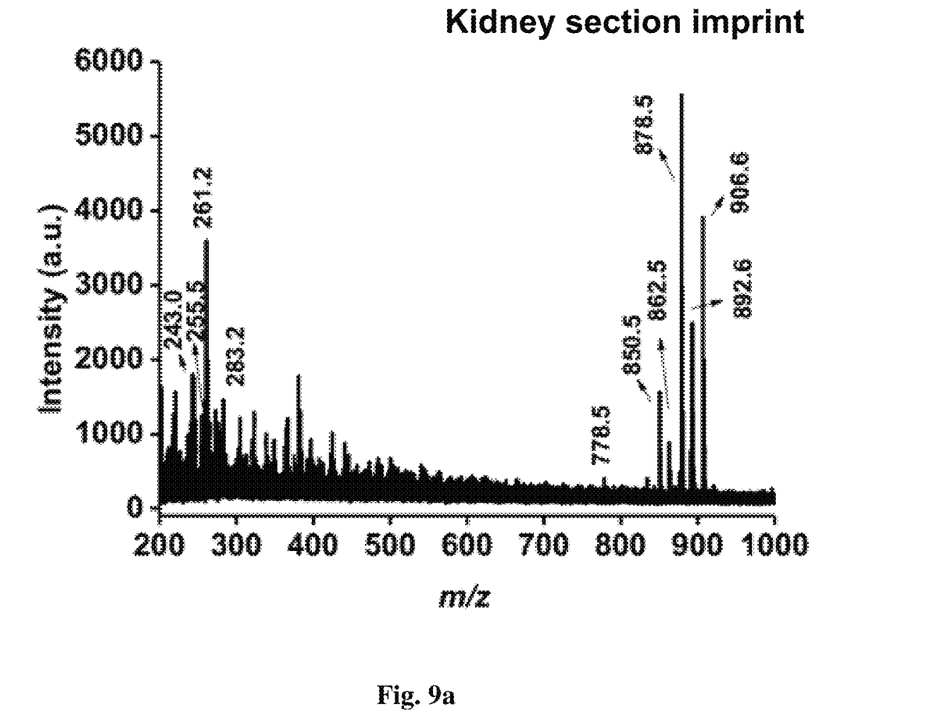
FIG. 9a shows mass spectra of liposomes in mouse kidney tissue obtained with a nanochip in a negative ion mode.
Figure 9B:
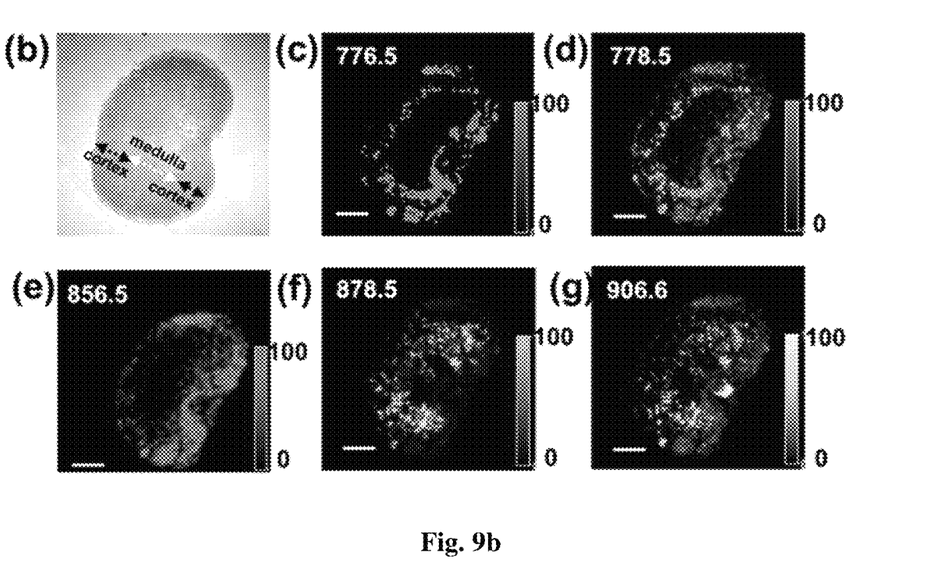
FIG. 9b is an MSI image diagram of six mass spectra peaks of mouse kidney tissue.

The nanochip can be used to quickly obtain metabolite information on a surface of living tissue and to realize mass spectrometry imaging. The nanochip of the disclosure can be directly pressed on and sample the tissue, without a need for spending several hours to make complex frozen slices and without the matrix during the test. The illustrated specific process is as follows: placing the kidney tissue of nude mice on a glass plate, directly contacting and pressing a front surface of the nanochip on a surface of the kidney tissue for 30 seconds, then thoroughly cleaning the surface of the chip with pure water, drying, and directly carrying out the mass spectrometry with a reflecting negative ion mode, with a molecular weight in the test <1000 Da, a laser pulse of 500 shots and using a delayed extraction. The mass spectra of liposomes in mouse kidney tissue with the negative ion mode as shown in FIG. 9a and the imaging diagram of six mass spectrum peaks as shown in FIG. 9b were obtained, the metabolites on the surface of the kidney tissue were effectively detected with clear signals, and mass spectrum peaks 776.5 and 778.5 were mainly distributed in a renal cortex region, and mass spectrum peaks 856.5, 878.5 and 906.6 were mainly concentrated in renal medulla region.

Embodiment 9: Application of Nanochip in Measurement of Serum Peptide Spectra

Figure 10:
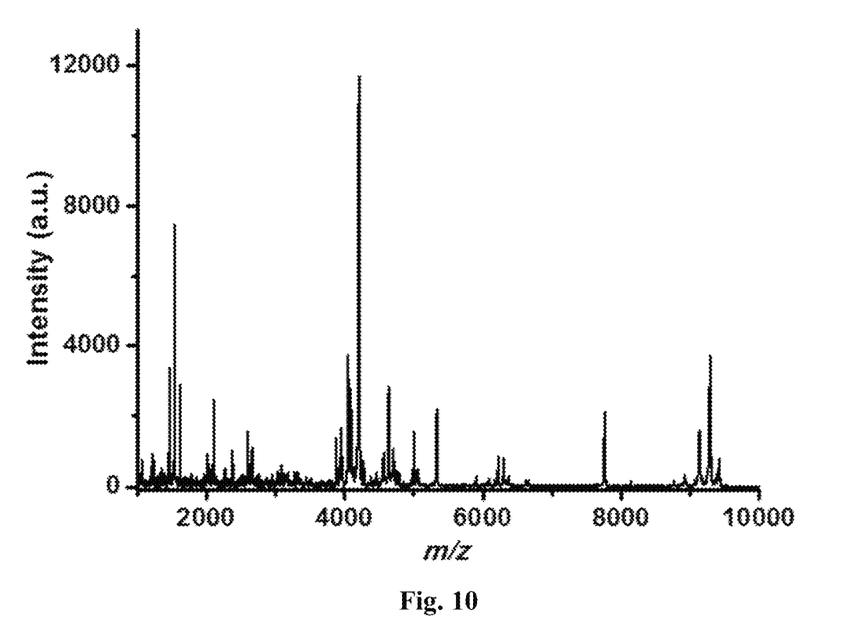
FIG. 10 is spectra of serum peptide tested with a nanochip.

A serum sample was diluted by 10 times with a buffer solution, a proper amount of which was dripped onto the nanochip, and after natural air drying, it is covered with 1 μL of alpha-cyano-4-hydroxycinnamic acid mass spectrometry matrix for cocrystallization, and an MALDI-TOF mass spectrometry is directly performed after natural air drying, with the linear positive ion mode, with a molecular weight in the test 1 to 10 KDa, a laser pulse of 1000 shots and using a delayed extraction. FIG. 10 is spectra of the serum peptide measured on the nano chip, with a strong signal intensity and a high signal-to-noise ratio.

It is obvious to those skilled in the art that the disclosure is not limited to the details of the above-mentioned exemplary embodiments, and can be implemented in other specific forms without departing from the spirit or basic features of the disclosure. Therefore, the embodiments should be regarded as exemplary and non-limiting in any respect and the scope of the disclosure is defined by the appended claims rather than the above description; therefore, all changes falling within the meaning and scope of the equivalents of the claims are intended to be encompassed in the disclosure.

What is claimed is:

1. A universal nanochip for mass spectrometry analysis, wherein a main material of the nanochip is a silicon-based semiconductor material, array-type spotting wells are distributed at a surface of the main material, and an inner surface of the spotting well is of a nanostructure; the surface of the main material has a regional hydrophobic modification, and inside the array-type spotting well is a hydrophilic region and outside the spotting well is a hydrophobic region; or outside the array-type spotting well is a hydrophilic region and inside the spotting well is a hydrophobic region, and the nanochip is used for detecting a substance of molecular weight<1000 Da or 1-10 KDa or 2-20 KDa or 2-10 KDa.

2. The universal nanochip for mass spectrometry analysis according to claim 1, wherein a thickness of the nanostructure is 0.2 to 5 μm.

3. The universal nanochip for mass spectrometry analysis according to claim 1, wherein the nanostructure is selected from any one or more of nanowires, nanofibers, nanocolumns, nanopyramids, nanoparticles, and nanoporous.

4. The universal nanochip for mass spectrometry analysis according to claim 1, wherein the silicon-based semiconductor material is selected from any one or more of single-crystal silicons, polycrystalline silicons, silicon-based epitaxial metals, silicon-based epitaxial nonmetallic elemental substances, and silicon-based epitaxial oxides.

5. The universal nanochip for mass spectrometry analysis according to claim 1, wherein a surface modification of the hydrophobic region is made by chemical vapor deposition or liquid phase chemical modification, and an adopted reagent is selected from any one or more of silanes, siloxanes, thiols, and terminal olefins.

6. The universal nanochip for mass spectrometry analysis according to claim 1, wherein the array-type spotting wells are round or square in shape.

7. The universal nanochip for mass spectrometry analysis according to claim 1, wherein the nano structure has a tip.

8. A preparing method of the universal nanochip for mass spectrometry analysis according to claim 1, comprising following steps:
- S1: scribing a main material, wherein the main material is scribed using a laser or a grinding wheel in a clean room;
- S2: cleaning the main material, wherein the scribed main material is placed in a concentrated sulfuric acid/hydrogen peroxide mixed solution for an ultrasonic cleaning, washing the solution on a surface of the main material with deionized water; and placing sequentially the main material into an ethanol solution and an isopropanol solution for an ultrasonic cleaning;
- S3: patterning the array-type spotting well, wherein any one or more of metal stamping, lithography, a blue film method and screen printing are adopted to realize a patterning design on the surface of the main material;
- S4: constructing a nanostructure on an inner surface of the array-type spotting well, wherein the nanostructure is prepared at a position corresponding to the array-type spotting well by using any one or more of reactive ion etching, chemical vapor deposition, physical vapor deposition, atomic layer deposition, wet chemical etching, a template method, a hydrothermal method and drop coating according to the pattern on the surface of the main material; and
- S5: hydrophobically modifying the surface of the main material.

9. An application of the universal nanochip for mass spectrometry analysis according to claim 1, comprising following aspects: rapid clinical identification of microorganisms; rapid detection of small molecule metabolites in biological samples; drug sensitivity testing of antibiotics; rapid mass spectrometry imaging of tissue samples; SNP gene detection; detection of protein and peptide in serum.

10. The application of the universal nanochip for mass spectrometry analysis according to claim 1, wherein the universal nanochip is applicated in the rapid detection of small molecule metabolites in biological samples, a variation rate of peak positions between the wells of the nanochip is below 600 ppm.

\* \* \* \* \*